(12) United States Patent
Kim et al.

(10) Patent No.: US 10,627,578 B2
(45) Date of Patent: Apr. 21, 2020

(54) CABLE DEVICE

(71) Applicant: SAMSUNG ELECTRONICS CO., LTD., Suwon-si, Gyeonggi-do (KR)

(72) Inventors: Jin Sub Kim, Suwon-si (KR); Baek Seok Ko, Suwon-si (KR); Sun Woo Kim, Suwon-si (KR); Dong Jin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/414,049

(22) Filed: May 16, 2019

(65) Prior Publication Data
US 2020/0064559 A1 Feb. 27, 2020

Related U.S. Application Data

(60) Provisional application No. 62/721,175, filed on Aug. 22, 2018.

(30) Foreign Application Priority Data

Oct. 17, 2018 (KR) .................. 10-2018-0124085

(51) Int. Cl.
*H01R 13/6594* (2011.01)
*G02B 6/38* (2006.01)
*G02B 6/44* (2006.01)
*H01R 12/57* (2011.01)
*H01B 3/00* (2006.01)
(Continued)

(52) U.S. Cl.
CPC ........... *G02B 6/3817* (2013.01); *G02B 6/428* (2013.01); *G02B 6/4277* (2013.01); *G02B 6/4278* (2013.01); *G02B 6/4417* (2013.01); *H01B 3/008* (2013.01); *H01R 12/57* (2013.01); *H01R 12/722* (2013.01); *H01R 13/6594* (2013.01)

(58) Field of Classification Search
CPC .. G02B 6/3817; G02B 6/4277; G02B 6/4278; G02B 6/428; G02B 6/4417; H01R 12/57; H01R 12/722; H01R 13/6594
USPC .............. 439/607.2, 607.09, 607.13, 607.17, 439/607.24, 607.36, 607.37, 607.4, 439/607.41, 607.45, 607.51, 607.55, 439/607.56, 607.57, 620.1, 620.13, 439/620.14, 620.22, 620.24; 385/88
See application file for complete search history.

(56) References Cited

U.S. PATENT DOCUMENTS 5,747,735 A * 5/1998 Chang ................ H01R 13/6485
174/51
5,797,771 A * 8/1998 Garside .............. H01R 13/6275
439/358

(Continued)

*Primary Examiner* — Harshad C Patel
(74) *Attorney, Agent, or Firm* — Staas & Halsey LLP

(57) ABSTRACT

Provided is a cable device including an optical cable capable of power transmission and a connector coupled with the optical cable, and having improved electromagnetic shielding performance. The cable device includes a cable; and a connector coupled to the cable, wherein the connector includes a printed circuit board (PCB) including a ground electrode, a shield case provided to accommodate the PCB and include a first face facing a mounting surface of the PCB and a second face perpendicular to the first face, and an elastic member arranged between the PCB and the shield case and provided to contact the ground electrode and the second face of the shield case so as to ground the shield case.

20 Claims, 10 Drawing Sheets

(51) Int. Cl.
*G02B 6/42* (2006.01)
*H01R 12/72* (2011.01)

(56) References Cited

U.S. PATENT DOCUMENTS

| | | | | |
|---|---|---|---|---|
| 6,863,448 | B2 * | 3/2005 | Chiu | G02B 6/3825 |
| | | | | 385/88 |
| 6,942,395 | B1 * | 9/2005 | Chuan | G02B 6/4278 |
| | | | | 385/53 |
| 7,223,915 | B2 * | 5/2007 | Hackman | H01R 13/6658 |
| | | | | 174/36 |
| 7,572,145 | B1 * | 8/2009 | Wu | H01R 13/6658 |
| | | | | 439/460 |
| 7,845,983 | B2 * | 12/2010 | Kawada | H01Q 1/1271 |
| | | | | 439/607.46 |
| 7,997,909 | B2 * | 8/2011 | Xu | H01R 13/6594 |
| | | | | 439/607.57 |
| 8,011,950 | B2 * | 9/2011 | McGrath | H01R 12/594 |
| | | | | 439/497 |
| 8,870,598 | B2 * | 10/2014 | Qi | H01R 13/6581 |
| | | | | 439/620.03 |
| 9,401,573 | B1 * | 7/2016 | Fernandez | H01R 13/6593 |
| 9,437,982 | B2 * | 9/2016 | Wu | H01R 43/20 |
| 2014/0073186 | A1 * | 3/2014 | Webb | H01R 13/6594 |
| | | | | 439/607.58 |
| 2014/0112632 | A1 * | 4/2014 | Keenum | G02B 6/428 |
| | | | | 385/139 |
| 2014/0307809 | A1 * | 10/2014 | Lo | H04B 3/28 |
| | | | | 375/257 |
| 2017/0294748 | A1 * | 10/2017 | Engl | H01R 13/6594 |

\* cited by examiner

CABLE DEVICE

CROSS-REFERENCE TO RELATED APPLICATION

This application is based on and claims priority under 35 U.S.C. § 119 to U.S. Provisional Patent Application No. U.S. 62/721,175 filed on Aug. 22, 2018, in the USPTO, and Korean Patent Application No. 10-2018-0124085 filed on Oct. 17, 2018, in the Korean Intellectual Property Office, the disclosures of which are incorporated herein by reference in its entirety.

BACKGROUND

1. Field of the Invention

The disclosure relates to a cable device including an optical cable capable of transmitting high voltage power and a connector coupled to the optical cable, and more particularly, to a cable device including a connector having improved electromagnetic interference (EMI) shielding performance.

2. Discussion of Related Art

Electromagnetic interference (EMI) is a disturbance in which electric signals are affected by electromagnetic fields, which is becoming worse these days due to a dramatic surge in technologies using electromagnetic waves. Hence, it is required to employ an electromagnetic shielding structure in modern electronic products.

Cables may include conductors for high voltage power transmission, such as copper wires. The cable may have an electromagnetic shielding structure that encloses the conductor to shield electromagnetic waves generated from the conductor.

The cable having the electromagnetic shielding structure comes in black or in a highly visible primary color. The appearance of the cable is easily identified by the naked eyes, so when the cable is connected to an electronic device, the cable may be exposed to the outside of the electronic device, spoiling the entire look of the electronic device.

A cable with no electromagnetic shielding structure is difficult to be identified by the naked eyes, and thus also called an invisible cable. The current trend is to use the invisible cable to prevent spoiling the design of electronic device.

However, in the case of using the invisible cable, electromagnetic shielding may not be attained at a connector coupled to the invisible cable.

SUMMARY OF THE INVENTION

The disclosure provides a cable device including an invisible cable with no electromagnetic shielding structure and a connector coupled to the invisible cable and having improved electromagnetic interference (EMI) shielding performance.

The disclosure also provides a cable device including an elastic member that electrically couples a ground electrode on a printed circuit board to a shield case without disturbing die bonding of an optical element onto the printed circuit board.

In accordance with an aspect of the disclosure, a cable device includes a cable; and a connector coupled to the cable, wherein the connector includes a printed circuit board (PCB) including a ground electrode, a shield case provided to accommodate the PCB and include a first face facing a mounting surface of the PCB and a second face perpendicular to the first face, and an elastic member arranged between the PCB and the shield case and provided to contact the ground electrode and the second face of the shield case so as to ground the shield case.

The cable may include a conductor provided to transmit power and an optic fiber provided to transmit an optical signal.

The elastic member and the shield case may include conductive materials to be electrically connected to each other by contact.

The cable may include a coating provided to accommodate the conductor and the optic fiber and be transparent to light.

The elastic member may be compressively deformed when accommodated in the shield case.

At least a portion of the elastic member may be provided to protrude outward from the mounting surface of the PCB.

The elastic member may be mounted on the PCB by a surface mounting technology (SMT) to be electrically connected to the ground electrode.

The elastic member may include a mounting part mounted on the PCB by the SMT, a bending part formed by being bent from the mounting part, and an extending part extending from the bending part, and the bending part may be provided to protrude outward from the mounting surface of the PCB.

Length of the elastic member in a direction parallel to the mounting surface of the PCB may be set to be greater than length of the elastic member in a direction perpendicular to the mounting surface.

The elastic member may include an elastic part provided to be elastically deformed by external force, a conductive outer part provided to cover an outer surface of the elastic part, and an adhesive part provided as at least a portion of the outer part to contact the ground electrode with adhesive strength.

The connector may include an optical element mounted on the PCB, and a driving integrated circuit (IC) mounted on the PCB to control the optical element.

The optical element and the driving IC may be mounted on the PCB by die bonding.

When the elastic member has height corresponding to the length of the elastic member in the direction perpendicular to the mounting surface of the PCB, the height of the elastic member may be set to about 1 mm or less to prevent the elastic member from disturbing die bonding of the optical element on the PCB.

The connector may include an outer case provided to accommodate the shield case and include an insulating material, and a plug coupled to the PCB and provided to couple a connecting part of an external device to the connector.

In accordance with another aspect of the disclosure, a cable device includes a cable including a conductor provided to transmit power; and a connector coupled to the cable, wherein the connector includes a printed circuit board (PCB) including a ground electrode, a shield case provided to cover all sides of the PCB, and an elastic member mounted on the PCB and provided to contact each of the ground electrode and the shield case to ground the shield case.

The cable may include an optic fiber provided to transmit an optical signal, and a coating provided to accommodate the conductor and the optic fiber to protect the conductor and the optic fiber, and the coating may be provided to be transparent.

The shield case may include a first face facing a mounting surface of the PCB and a second face perpendicular to the first face, and the elastic member may be provided to contact the second face.

At least a portion of the elastic member may be provided to protrude outward from the mounting surface of the PCB.

In accordance with another aspect of the disclosure, a cable device includes a cable including a conductor and a coating provided to cover the conductor and be transparent; and a connector coupled to the cable, wherein the connector includes a printed circuit board (PCB) including a ground electrode, a conductive shield case provided to accommodate the PCB, and an elastic member provided to electrically connect the ground electrode to the shield case and be compressively deformed between the PCB and the shield case when the PCB is accommodated in the shield case.

The shield case may include a first face facing a mounting surface of the PCB, and the elastic member may be provided to contact the ground electrode and the first face.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
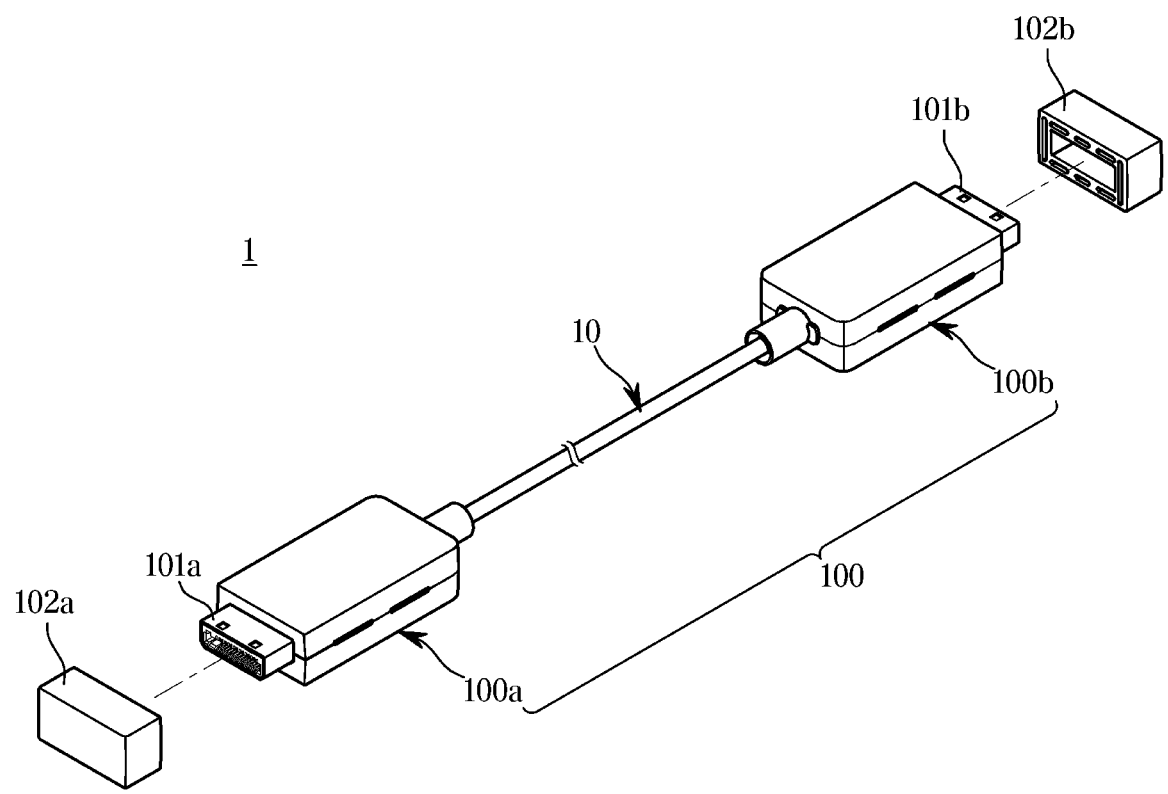
FIG. 1 is a perspective view of a cable device, according to an embodiment of the disclosure.

Embodiments and features as described and illustrated in the present disclosure are only preferred examples, and various modifications thereof may also fall within the scope of the disclosure.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the present disclosure.

A cable device according to various embodiments of the disclosure may be connected to an electronic device. For example, the electronic device in embodiments may include all mobile communication terminals that operate based on communication protocols corresponding to various communication systems, and all information communication devices, multimedia devices, and application devices thereof, such as video phones, e-book readers, laptop personal computers (PCs), netbook computers, Personal Digital Assistants (PDAs), Portable Multimedia Players (PMPs), MPEG-1 audio layer-3 (MP3) players, mobile medical devices, cameras, and wearable devices (e.g., Head-Mounted Devices (HMDs) such as electronic glasses, electronic clothes, electronic bracelets, electronic necklaces, electronic appcessories, electronic tattoos, or smart watches).

In some embodiments, the electronic device may be a smart home appliance. The smart home appliance may include at least one of e.g., televisions, Digital Video Disc (DVD) players, audio systems, refrigerators, air conditioners, cleaning machines, ovens, microwaves, washing machines, air purifiers, set-top boxes, TV sets (e.g., Samsung HomeSync™, Apple TV™, or Google TV™), game consoles, electronic dictionaries, electronic keys, camcorders, and electronic albums.

In some embodiments, the electronic device may include at least one of a variety of medical equipment (e.g., Magnetic Resonance Angiography (MRA), Magnetic Resonance Imaging (MRI), Computed Tomography (CT), photographing device, ultrasonic device, etc.), navigation devices, Global Positioning System (GPS) receivers, Event Data Recorders (EDRs), Flight Data Recorders (FDRs), car infotainment devices, marine electronic devices (e.g., marine navigation systems, gyro-compass, etc.), avionics, security devices, car head units, industrial or home robots, banking agency's Automatic Teller Machines (ATMs), or Point of Sales (POSs) for shops.

In some embodiments, the electronic device may include at least one of part of furniture or building/structure including a communication capability, electronic boards, electronic signature receiving devices, projectors, or various instrumental equipment (e.g., meters for water, electricity, gas, or radio waves).

The electronic device in accordance with various embodiments of the disclosure may be one or more combinations of the aforementioned devices. In addition, the electronic device in accordance with various embodiments of the disclosure may be a flexible device. It will be obvious to a person of ordinary skill in the art that the electronic device is not limited to the aforementioned examples.

As will be described later, an elastic member may include first to third elastic members.

Reference will now be made in detail to embodiments, examples of which are illustrated in the accompanying drawings, wherein like reference numerals refer to the like elements throughout.

Figure 2:
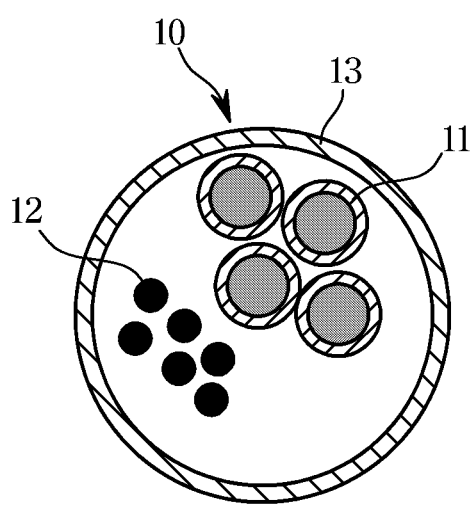
FIG. 2 is a cross-sectional view of a cable in a cable device, according to an embodiment of the disclosure.
Figure 3:
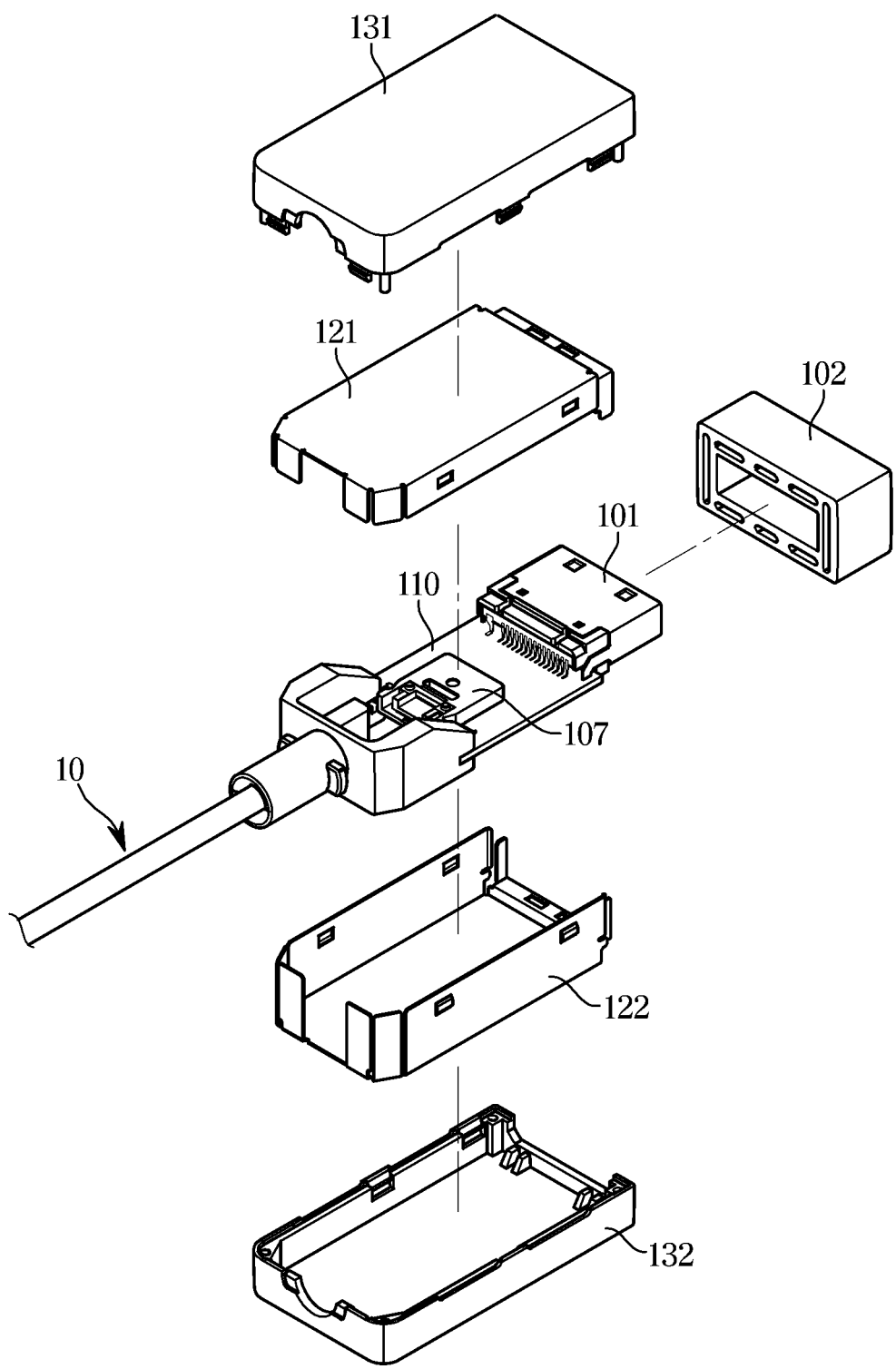
FIG. 3 is an exploded perspective view of a cable device, according to an embodiment of the disclosure.

FIG. 1 is a perspective view of a cable device, according to an embodiment of the disclosure. FIG. 2 is a cross-sectional view of a cable in a cable device, according to an embodiment of the disclosure. FIG. 3 is an exploded perspective view of a cable device, according to an embodiment of the disclosure.

Referring to FIG. 1, a cable device 1 according to an embodiment may include a cable 10, and a connector 100 coupled to the cable 10. The connector 100 may include a first connector 100a to be coupled to a first external device (not shown) and a second connector 100b to be coupled to a second external device (not shown). The cable 10 may be provided to connect the first and second connectors 100a and 100b to each other. The first and second connectors 100a and 100b may have the same configuration. The connector 100 having the first and second connectors 100a and 100b that are provided in the same configurations, will now be described.

The connector 100 may include a plug 101 to be coupled with a plug receptor (not shown) of an external device (not shown) and a plug cap 102 to cover the plug 101 to prevent dust from being brought into the plug 101. The plug cap 102 may be detachably coupled with the plug 101 to be separated from the plug 101 when the plug 101 is combined with the plug receptor. The user may cover the plug 101 with the plug cap 102 while not using the cable device 1, thereby preventing foreign materials such as dust from being brought into the plug 101.

The connector 100 may include an outer case 131 and 132 provided to accommodate at least a portion of the plug 101. The outer case 131 and 132 may also serve as a grip part. The user may grip the outer case 131 and 132 with his/her finger(s) to combine the plug 101 with the plug receptor of the external device. When the user grips the outer case 131 and 132 and a current flows across the outer case 131 and 132, the user might be in danger of getting electric shock. To prevent this, the outer case 131 and 132 may be formed of an insulating material.

An internal structure of the cable in the cable device according to an embodiment of the disclosure will now be described in connection with FIG. 2.

Referring to FIG. 2, the cable 10 may include a conductor 11, an optic fiber 12, and a coating 13 for accommodating the conductor 11 and the optic fiber 12. The conductor 11 may be provided to transmit power from a first external device (not shown) to a second external device (not shown) or from the second external device to the first external device. The optic fiber 12 may be provided to transmit an optical signal from the first external device to the second external device or from the second external device to the first external device.

According to the disclosure, the cable 10 may include the conductor 11 to transmit power from the first external device to the second external device or from the second external device to the first external device.

The conductor 11 may include a copper wire. The conductor 11 and the optic fiber 12 may be each provided in the plural.

The coating 13 may be provided to accommodate the conductor 11 and the optic fiber 12. The coating 13 may be made of an insulating material. Furthermore, the coating 13 may be provided to be less noticeable to the user. For example, the coating 13 may be provided to be transparent to light. The coating 13 through which light passes may be said as being transparent. The transparent coating 13 may be less noticeable to the user, thereby giving an improved aesthetic sense without spoiling the appearance of the electric device.

Alternatively, the coating 13 may be provided to reflect external light in order not to be easily seen by the eye of the user. The coating 13 may be made of a colorless substance having a certain reflectance. 'Being colorless' may imply both being transparent and opaque. The coating 13 may be formed to have a certain reflectance to reflect light incident on the coating 13. This may prevent the conductor 11 and the optic fiber 12 arranged within the coating 13 from being easily seen from the outside.

According to an embodiment of the disclosure, the cable 10 may not include a filling, which is otherwise arranged in the coating 13 to fill the space between the coating 13, the conductor 11, and the optic fiber 12. The filling is normally provided to prevent the optic fiber from being cut by bending by preventing the cable from being bent at more than certain angle. The filling may be provided to reinforce the relatively week flexural rigidity of the optic fiber. According to an embodiment of the disclosure, the cable 10 includes the conductor 11 within the coating 13, and the conductor 11 has a relatively strong flexural rigidity. With the conductor 11 arranged in the coating 13, the flexural rigidity of the cable 10 may be increased. As the flexural rigidity of the cable 10 increases, the optic fiber 12 may be prevented from being cut off when the cable 10 is bent even though there is no filling provided within the coating 13.

Further, according to the disclosure, the cable 10 may not include an electromagnetic shielding structure. Ordinary cables including conductors may have an electromagnetic shielding structure to shield electromagnetic waves transmitted from an external device to the outside of the cable through the conductors. For example, an electromagnetic shielding structure may include an aluminum foil and/or a braid wire provided to cover the conductor. In this case, the cable having the electromagnetic shielding structure comes in color easily noticeable to the user, such as black. Such a cable that is highly visible to the user may spoil the appearance of the electronic device. To improve the aesthetic sense of the electronic device without spoiling the appearance, the cable 10 according to the present disclosure may not include the electromagnetic shielding structure. In this case, however, without the electromagnetic shielding structure, electromagnetic interference (EMI) shielding is not made at the connector coupled to the cable, and thus, a method to shield the EMI is required. According to the disclosure, a cable device including an optical cable capable of transmitting power without any electromagnetic shielding structure may have improved EMI shielding performance at the connector coupled to the optical cable.

Referring to FIG. 3, the cable device 1 according to an embodiment may include the cable 10, and the connector 100 coupled to the cable 10. The connector 100 may include a printed circuit board (PCB) 110, a plug 101 coupled with the PCB 110 to connect the connector 100 to an external device (not shown), a shield case 121 and 122 provided to accommodate the PCB 110, and an outer case 131 and 132 provided to cover the shield case 121 and 122. The connector 100 may further include a plug cap 102 provided to protect the plug 101.

The PCB 110 may include a lens 107 for transmitting an optical signal to the PCB 110 from the optic fiber 12. An optical element 104 (see FIG. 5) and a driving integrated circuit (IC) 103 (see FIG. 5) may be arranged inside the lens 107. The optical element 104 may include a vertical cavity surface emitting laser (VCSEL) chip, and a photo diode (PD) chip.

The shield case 121 and 122 may be provided to cover all sides of the PCB 110. In other words, the shield case 121 and 122 may be provided to accommodate the PCB 110. The shield case 121 and 122 may include a conductive material. For example, the shield case 121 and 122 may include a metal substance.

The outer case 131 and 132 may include an insulating material. The outer case 131 and 132 may be arranged to come into contact with the shield case 121 and 122. Since the outer case 131 and 132 is insulating, no current may flow across the outer case 131 and 132 even when a current flows across the conductive shield case 121 and 122. Accordingly, the user may not get shocked from a current flowing from an external device (not shown) to the connector 100 through the cable 10 when the user touches or grips the outer case outer case and 132.

Figure 4:
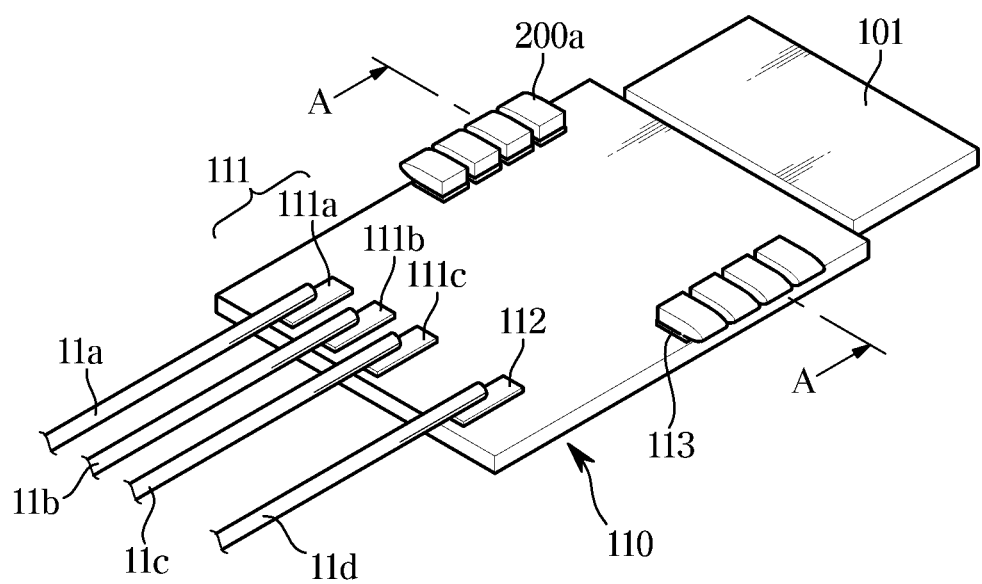
FIG. 4 shows some configuration including a printed circuit board and an elastic member mounted on the printed circuit board in a cable device, according to an embodiment of the disclosure.
Figure 5:
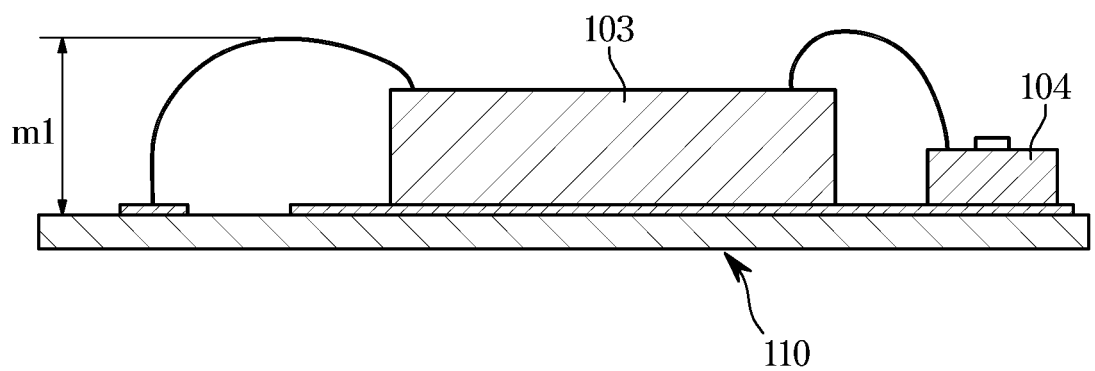
FIG. 5 is a side view of a printed circuit board, and an optical element and a driving integrated circuit (IC) mounted on the printed circuit board in a cable device, according to an embodiment of the disclosure.

FIG. 4 shows some configuration including a PCB and an elastic member mounted on the PCB in a cable device, according to an embodiment of the disclosure. FIG. 5 is a side view of a PCB, and an optical element and a driving IC mounted on the PCB in a cable device, according to an embodiment of the disclosure.

The PCB 110 and parts mounted on the PCB 110 according to the disclosure will be described in detail in connection with FIGS. 4 and 5. In FIG. 4, the optical element 104 and the driving IC 103 provided to control the optical element 104, which are mounted on the PCB 110, are not shown.

Referring to FIG. 4, the PCB 110 according to an embodiment of the disclosure may include a power electrode 111 connected to the conductor 11 of the cable 10.

The conductor 11 may be provided in the plural. For example, the conductor 11 may include a first conductor 11a, a second conductor 11b, a third conductor 11c, and a fourth conductor 11d.

The power electrode 111 may also be provided in the plural. For example, the power electrode 111 may include a first power electrode 111a, a second power electrode 111b, and a third power electrode 111c.

The first to third conductors 11a, 11b, and 11c may be arranged to come into contact with the first to third power electrodes 111a, 111b, and 111c, respectively. The conductor 11 may be provided to transmit power. The conductor 11 may transmit power to the PCB 110 through the power electrode 111. The conductor 11 may transmit higher power to the PCB 110 as there are more number of conductors 11 and power electrodes 111.

The fourth conductor 11d may be arranged to come into contact with a first ground electrode 112. The first ground electrode 112 may have a digital ground (DGND) potential. The first ground electrode 112 may serve as a return path of a positive (+) electrode.

The PCB 110 may further include a second ground electrode 113. Like the first ground electrode 112, the second ground electrode 113 may have the DGND potential and serve as a return path of a positive (+) electrode. The second ground electrode 113 may be arranged to be close to edges of the PCB 110.

As described above, the PCB 110 may include the plug 101. A simplified version of the plug 101 is shown in the drawings.

According to an embodiment of the disclosure, the connector 100 may include a first elastic member 200a mounted on the PCB 110. The first elastic member 200a may be arranged to come into contact with the second ground electrode 113. The first elastic member 200a may be mounted on the PCB 110 using the surface mounting technology (SMT). The first elastic member 200a may be conductive. Accordingly, the first elastic member 200a may be electrically coupled with the second ground electrode 113 by contact.

The first elastic member 200a may include a surface mounted device (SMD) gasket. The first elastic member 200a may include an elastically deformable elastic body, and a conductive exterior to cover the outer surface of the elastic body. Accordingly, the first elastic member 200a may be elastically deformable and conductive. Furthermore, as shown in FIG. 4, the first elastic member 200a may be arranged such that at least a portion of the first elastic member 200a protrudes outward from the mounting surface of the PCB 110. The first elastic member 200a may also be provided in the plural. This is to increase an area of contact between the first elastic member 200a and the second ground electrode 113.

According to the disclosure, the first elastic member 200a may be provided to be about 1 mm or less high. This is for the first elastic member 200a not to disturb mounting of the optical element 104 and the driving IC 103 on the PCB 110 by die bonding.

Referring to FIG. 5, the optical element 104 and the driving IC provided to control the optical element 104 may be mounted on the PCB 110 by die bonding. Furthermore, the driving IC 103 and the optical element 104 may be electrically connected by wire bonding. Moreover, the driving IC 103 and an electrode on the PCB 110 may be electrically connected by wire bonding. The die bonding and the wire bonding may be collectively called 'a chip on board'.

As described above, the cable 10 may include the optic fiber 12, and the connector 100 may include the optical element 104 provided to transmit an optical signal to the optic fiber 12 or receive an optical signal from the optic fiber 12. The optical element 104 and the driving IC 103 for controlling the optical element 104 may be mounted on the PCB 110. The optical element 104 and the driving IC 103 are vulnerable to heat, so they are hardly mounted on the PCB 110 by the SMT. Specifically, when the optical element 104 and the driving IC 103, which are vulnerable to heat, are first mounted on the PCB 110, and then other parts are mounted around the optical element 104 and the driving IC 103 using the SMT, the optical element 104 and the driving IC 103 may not work properly due to heat. Hence, in order to use the SMT to mount certain parts on the PCB 110, the parts need to be mounted on the PCB 110 before the optical element 104 and the driving IC 103 are mounted on the PCB. For example, the first elastic member 200a needs to be mounted using the SMT before the optical element 104 and the driving IC 103 are mounted on the PCB 110.

However, the first elastic member 200a, which is mounted on the PCB 110 earlier than the optical element 104 and the driving IC 103, may disturb operation of mechanical equipment that performs the die bonding and/or the wire bonding (hereinafter, referred to as die bonding equipment). Specifically, a maximum distance from the die bonding equipment to the PCB 110 is determined in advance. The reference symbol 'm1' shown in FIG. 5 may indicate the maximum distance from the die bonding equipment. For example, m1 may be about 1 mm.

If there is a part around the optical element 104 and the driving IC 103, which is higher than the maximum distance from the die bonding equipment, the die bonding equipment may collide with the part. Hence, the die bonding equipment may not properly perform die bonding. Accordingly, a part to be mounted on the PCB 110 needs to be not higher than the maximum distance m1 from the die bonding equipment. For example, the first elastic member 200a may not be higher than 1 mm. The height of the first elastic member 200a may correspond to a vertical length of the first elastic member 200a from the mounting surface of the PCB 110.

Figure 6:
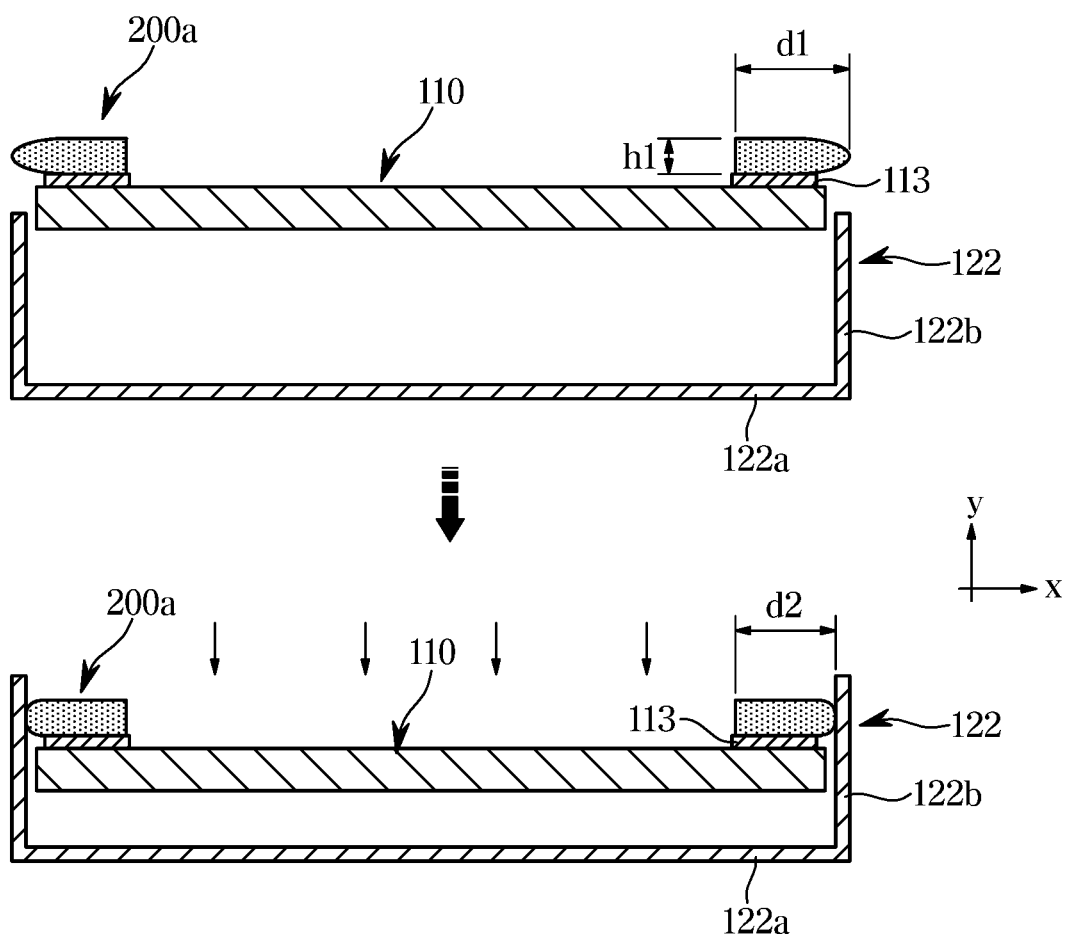
FIG. 6 shows a process of inserting a printed circuit board to a shield case in a cable device, according to an embodiment of the disclosure.

FIG. 6 shows a process of inserting a PCB to a shield case in a cable device, according to an embodiment of the disclosure.

A process of inserting the first elastic member 200a to the shield case 121 and 122 according to an embodiment of the disclosure will now be described in detail.

Referring to FIG. 6, the height h1 of the first elastic member 200a may be less than the width d1 of the first elastic member 200a. The height h1 of the first elastic member 200a may correspond to a length along the y-axis of the first elastic member 200a, and the width d1 of the first elastic member 200a may correspond to a length along the x-axis of the first elastic member 200a. The y-axis shown may correspond to a direction that is perpendicular to the mounting surface of the PCB 110. The x-axis shown may correspond to a direction that is parallel to the mounting surface of the PCB 110.

The shield case 121 and 122 may include an upper shield case 121 and a lower shield case 122. While in the following description the first elastic member 200a contacts the lower shield case 122, embodiments of the disclosure are not limited thereto. The first elastic member 200a may be arranged to come into contact with the upper shield case 121.

The first elastic member 200a may also be provided to be elastically deformable. Furthermore, the outside of the first elastic member 200a may be formed of a conductive material. Accordingly, the first elastic member 200a may be conductive.

At least a portion of the first elastic member 200a may protrude outward from the mounting surface of the PCB 110. In other words, at least a portion of the first elastic member 200a may protrude in a lateral direction of the PCB 110. The lateral direction of the PCB 110 may correspond to the x-axis.

When the PCB 110 is put into the lower shield case 122, the width of the first elastic member 200a may be reduced. Specifically, the width of the first elastic member 200a may be reduced from d1 to d2 as the first elastic member 200a is compressively deformed. As described above, since the first elastic member 200a is elastically deformable, it may not be damaged even when elastically deformed. Furthermore, even though an assembly tolerance is caused when the PCB 110 is put into the lower shield case 122, the first elastic member 200a and the lower shield case 122 may contact stably.

The first elastic member 200a may be arranged to come into contact with the sides of the lower shield case 122. The bottom side 122a of the lower shield case 122 may be opposite to the mounting surface of the PCB 110. The sides 122b of the lower shield case 122 may be perpendicular to the mounting surface of the PCB 110.

When the first elastic member 200a is arranged to contact the upper surface of the upper shield case 121, the height h1 of the first elastic member 200a may be greater than the maximum distance m1 from the die bonding equipment. Accordingly, to have the height h1 of the first elastic member 200a be equal to or less than the maximum distance m1 from the die bonding equipment, the first elastic member 200a may be arranged to come into contact with the sides 122b of the lower shield case 122. This may be called a side grounding structure.

The first elastic member 200a may be mounted on the PCB 110 by the SMT to come into contact with the ground electrode 113, and may contact the sides 122b of the lower shield case 122 when accommodated in the lower shield case 122. Since both the first elastic member 200a and the lower shield case 122 are conductive, the contact between the first elastic member 200a and the lower shield case 122 may enable the first elastic member 200a, the lower shield case 122, and the ground electrode 113 to be electrically connected. Accordingly, the lower shield case 122 and the upper shield case 121 combined with the lower shield case 122 may be electrically connected to the ground electrode 113. The shield case 121 and 122 may have the same potential as that of the ground electrode 113.

According to the disclosure, when the shield case 121 and 122 provided to cover all the sides of the PCB 110 have the ground (GND) potential, the EMI shielding performance may be improved. For this, the elastic member according to the disclosure may electrically connect the ground electrode to the shield case. The elastic member may be provided to come into contact with each of the ground electrode and the shield case. With this structure, the cable device 1 according to the disclosure may have improved EMI shielding performance at the connector 100 even with the invisible optical cable having no electromagnetic shielding structure.

Figure 7:
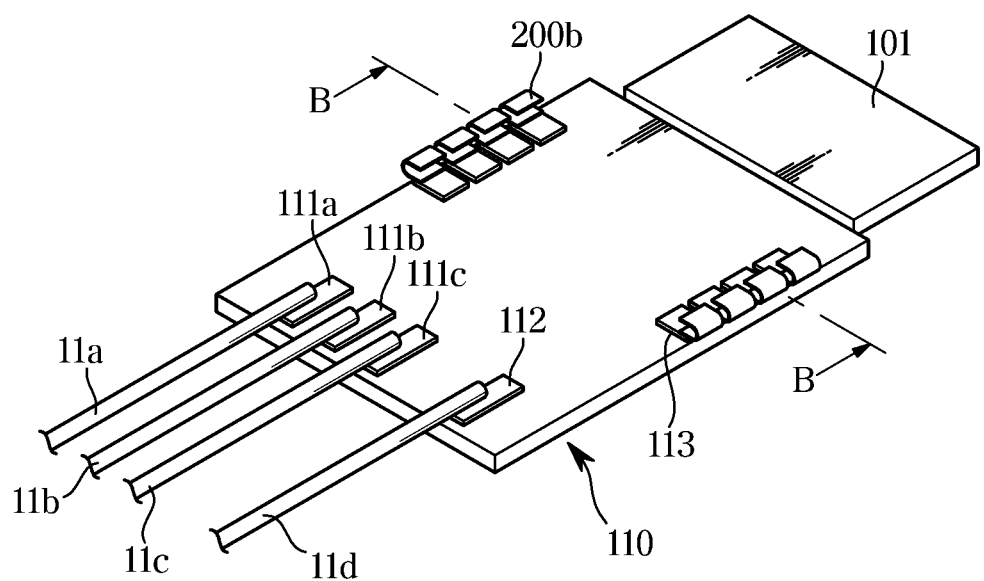
FIG. 7 shows some configuration including a printed circuit board and an elastic member mounted on the printed circuit board in a cable device, according to another embodiment of the disclosure.
Figure 8:
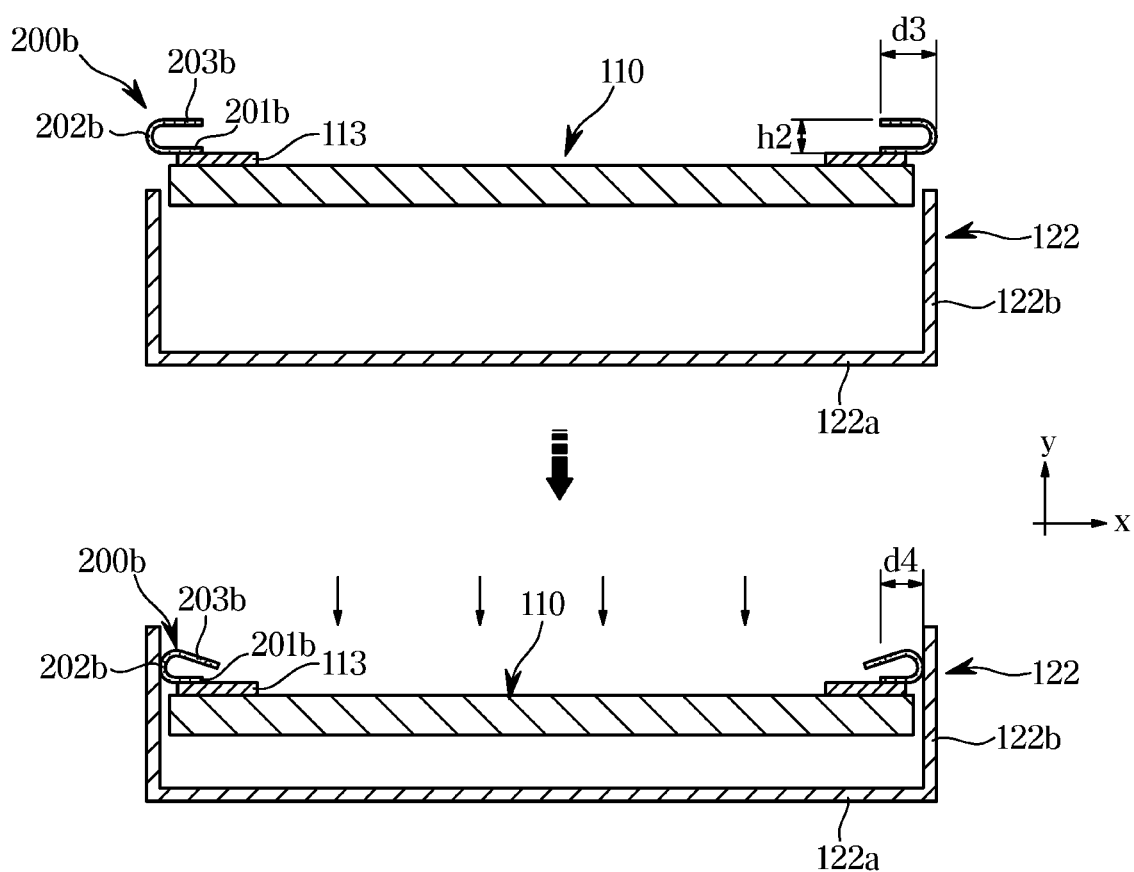
FIG. 8 shows a process of inserting a printed circuit board to a shield case in a cable device, according to another embodiment of the disclosure.

FIG. 7 shows some configuration including a PCB and an elastic member mounted on the PCB in a cable device, according to another embodiment of the disclosure. FIG. 8 shows a process of inserting a PCB to a shield case in a cable device, according to another embodiment of the disclosure.

Another embodiment of the disclosure will now be described in detail.

In the embodiment, the PCB 110 may have a second elastic member 200b mounted thereon. The configuration is the same as in the previous embodiment except for the second elastic member 200b, so the overlapping description thereof will not be repeated.

The second elastic member 200b may be elastic. The second elastic member 200b may also be conductive. For example, the second elastic member 200b may be made of a metal substance. Specifically, the second elastic member 200b may be formed by bending a metal plate.

Referring to FIG. 8, the second elastic member 200b may include a mounting part 201b, a bending part 202b, and an extending part 203b. The mounting part 201b may be provided to contact the ground electrode 113 of the PCB 110. The mounting part 201b may be mounted on the PCB 110 by the SMT. The bending part 202b may be formed by bending an end of the mounting part 201b. The extending part 203b may extend from the bending part 202b. The cross-section of the second elastic member 200b may be shaped almost like a letter 'C'.

The second elastic member 200b may have height h2 and width d3. The height h2 of the second elastic member 200b may be equal to or less than the maximum distance m1 from the die bonding equipment. At least a portion of the second elastic member 200b may protrude in a lateral direction of the PCB 110.

When the PCB 110 is put into the lower shield case 122, the width of the second elastic member 200b may be reduced. Specifically, the width of the second elastic member 200b may be reduced from d3 to d4 as the second elastic member 200b is elastically deformed. As described above, since the second elastic member 200b is elastically deformable, it may not be damaged even when elastically deformed. Furthermore, even though an assembly tolerance is caused when the PCB 110 is put into the lower shield case 122, the second elastic member 200b and the lower shield case 122 may contact stably.

As described above, when the shield case 121 and 122 have the GND potential, the EMI shielding performance of the connector 100 may be improved. For this, the second elastic member 200b may electrically connect the ground electrode 113 to the sides 122b of the lower shield case 122. The second elastic member 200b may be arranged to come into contact with each of the ground electrode 113 and the lower shield case 122. With this structure, the cable device 1 may have improved EMI shielding performance at the connector 100 even with the invisible optical cable having no electromagnetic shielding structure.

Figure 9:
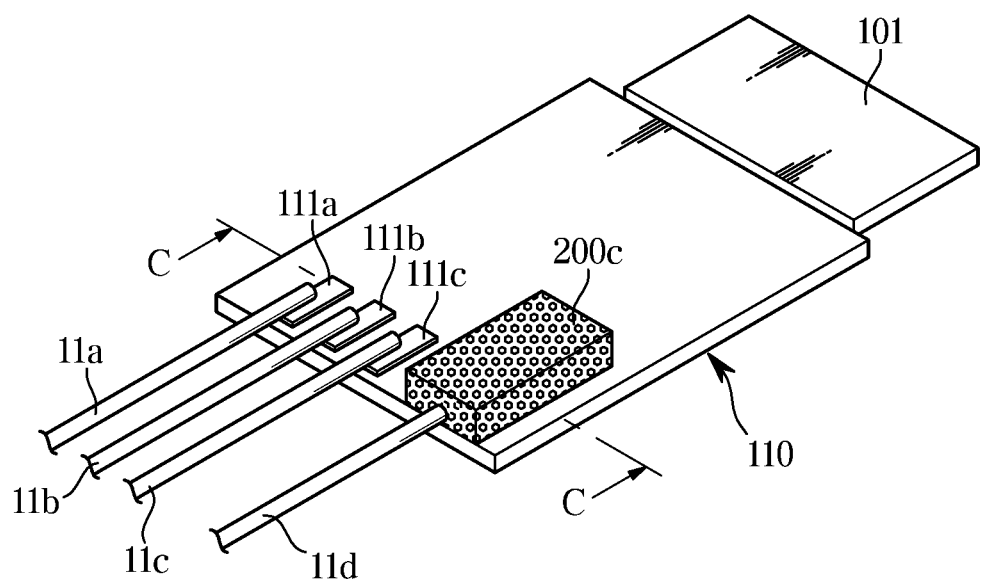
FIG. 9 shows some configuration including a printed circuit board and an elastic member mounted on the printed circuit board in a cable device, according to another embodiment of the disclosure.
Figure 10:
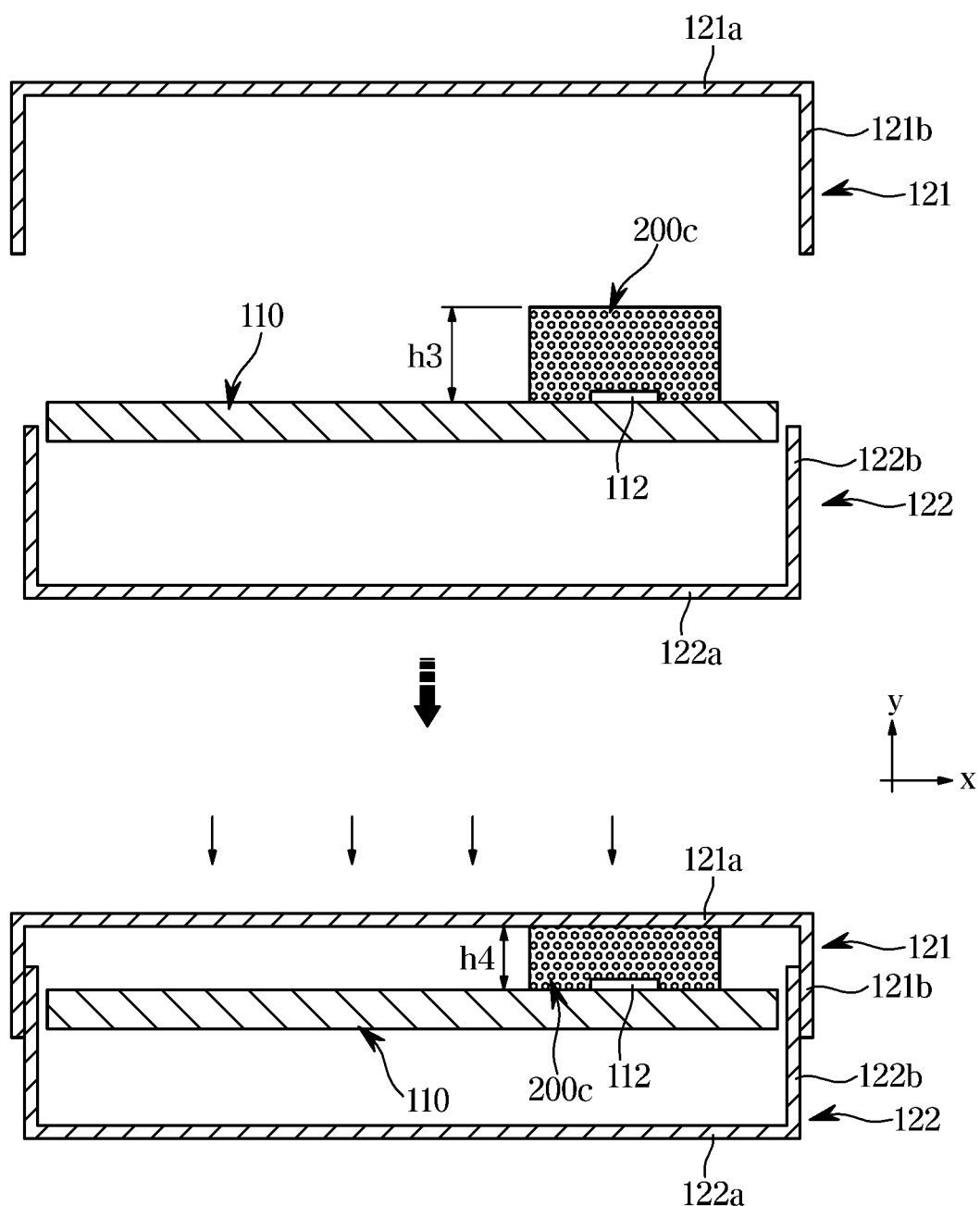
FIG. 10 shows a process of inserting a printed circuit board to a shield case in a cable device, according to another embodiment of the disclosure.

FIG. 9 shows some configuration including a PCB and an elastic member mounted on the PCB in a cable device, according to another embodiment of the disclosure. FIG. 10 shows a process of inserting a PCB to a shield case in a cable device, according to another embodiment of the disclosure.

A cable device according to the embodiment will now be described in connection with FIGS. 9 and 10.

Referring to FIG. 9, a cable device according to the embodiment of the disclosure may include a third elastic member 200c.

The third elastic member 200c may include an elastic part provided to be elastically deformed by external force, an outer part provided to cover the outer surface of the elastic part and to be conductive, and an adhesive part having adhesive strength. The outer part may form the outer surface of the third elastic member 200c, and the elastic part may be arranged on the inside of the outer part. The adhesive part may be provided on a side facing the PCB 110. The third elastic member 200c may stick to the PCB 110 via the adhesive part. The third elastic member 200c may include a sponge gasket.

According to another embodiment of the disclosure, the third elastic member 200c may be mounted on the PCB 110 not by the SMT. The third elastic member 200c may stick to the PCB 110 by the adhesive part with adhesive strength. The third elastic member 200c may contact the PCB 110 such that the conductive outer part comes into contact with the first ground electrode 112.

Since the third elastic member 200c is mounted on the PCB 110 not by the SMT, sticking the third elastic member 200c to the PCB 110 does not cause heat. Accordingly, even when the third elastic member 200c sticks to the PCB 110 after die bonding of the optical element 104 and the driving IC 103 on the PCB 110, the optical element 104 and the driving IC 103 may not be deformed by heat. The third elastic member 200c may stick to the PCB 110 after the optical element 104 and the driving IC 103 are mounted on the PCB 110 by die bonding.

Since the third elastic member 200c sticks to the PCB 110 after completion of the die bonding, it may not disturb operation of the die bonding equipment even when the height h3 of the third elastic member 200c (see FIG. 10) is greater than the maximum distance m1 from the die bonding equipment.

When the third elastic member 200c is not inserted to the shield case 121 and 122, the height h3 of the third elastic member 200c may be greater than the maximum distance m1 from the die bonding equipment.

Referring to FIG. 10, the height h3 of the third elastic member 200c may be reduced as the PCB 110 is inserted to the shield case 121 and 122. Specifically, the height of the third elastic member 200c may be reduced from h3 to h4 as the PCB 110 is inserted to the shield case 121 and 122. The height h4 may be the same as the distance between the mounting surface of the PCB 110 and top 121a of the upper shield case 121.

The third elastic member 200c may contact the first ground electrode 112 and the top 121a of the upper shield case 121. The outer surface of the third elastic member 200c is conductive, so the shield case 121 and 122 may have the GND potential when the third elastic member 200c contacts the first ground electrode 112 and the upper shield case 121.

As described above, when the shield case 121 and 122 has the GND potential, the EMI shielding performance of the connector 100 may be improved. For this, the third elastic member 200c may electrically connect the first ground electrode 112 to the top 121a of the upper shield case 121. The third elastic member 200c may be arranged to come into contact with each of the first ground electrode 112 and the upper shield case 121. With this structure, the cable device 1 may have improved EMI shielding performance at the connector 100 even with the invisible optical cable having no electromagnetic shielding structure.

According to the disclosure, a cable device including an invisible cable with no electromagnetic shielding structure and a connector coupled to the invisible cable, and having improved electromagnetic interference (EMI) shielding performance at the connector may be provided.

According to the disclosure, a cable device including an elastic member that electrically couples a ground electrode on a PCB to a shield case without disturbing die bonding of an optical element onto the PCB may be provided.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:
1. A cable device comprising:
a cable; and
a connector coupled to the cable,
wherein the connector comprises:
a printed circuit board (PCB) including a ground electrode,
a shield case in which the PCB is accommodated, and including a first face facing a mounting surface of the PCB and a second face perpendicular to the mounting surface of the PCB, and
an elastic member, accommodated in the shield case, contacting the ground electrode and the second face of the shield case so as to ground the shield case.
2. The cable device of claim 1, wherein the cable comprises a conductor provided to transmit power and an optic fiber provided to transmit an optical signal.

3. The cable device of claim 1, wherein the elastic member and the shield case include conductive materials to be electrically connected to each other by contact.

4. The cable device of claim 2, wherein the cable comprises a coating accommodating the conductor and the optic fiber, and being transparent to light.

5. The cable device of claim 1, wherein the elastic member is deformable so that the elastic member is compressively deformed when accommodated in the shield case.

6. The cable device of claim 1, wherein at least a portion of the elastic member protrudes outward from the mounting surface of the PCB to contact the second face of the shield case.

7. The cable device of claim 6, wherein the elastic member is mounted on the PCB by a surface mounting technology (SMT) to be electrically connected to the ground electrode.

8. The cable device of claim 1, wherein the elastic member comprises:
a mounting part mounted on the PCB by a surface mounting technology (SMT) to be electrically connected to the ground electrode,
a bending part bent from the mounting part and protruding outward from the mounting surface of the PCB so as to contact the second face of the shield case, and
an extending part extending from the bending part.

9. The cable device of claim 6, wherein a length of the elastic member in a direction parallel to the mounting surface of the PCB is greater than a length of the elastic member in a direction perpendicular to the mounting surface.

10. The cable device of claim 1, wherein the connector comprises:
an optical element mounted on the PCB, and
a driving integrated circuit (IC) mounted on the PCB to control the optical element.

11. The cable device of claim 10, wherein the optical element and the driving IC are mounted on the PCB by die bonding.

12. The cable device of claim 11, wherein a height of the elastic member in a direction perpendicular to the mounting surface of the PCB is about 1 mm or less to prevent the elastic member from disturbing die bonding of the optical element on the PCB.

13. The cable device of claim 1, wherein the connector comprises:
an outer case accommodating the shield case and including an insulating material, and
a plug coupled to the PCB to couple a connecting part of an external device to the connector.

14. A cable device comprising:
a cable including a conductor provided to transmit power; and
a connector coupled to the cable,
wherein the connector comprises:
a printed circuit board (PCB) including a ground electrode,
a shield case covering all sides of the PCB, and
an elastic member mounted on the PCB and contacting the ground electrode and the shield case to ground the shield case.

15. The cable device of claim 14, wherein
the cable comprises an optic fiber provided to transmit an optical signal, and a coating accommodating the conductor and the optic fiber to protect the conductor and the optic fiber, and
the coating is transparent.

16. The cable device of claim 14, wherein
the shield case includes a first face facing a mounting surface of the PCB and a second face perpendicular to the mounting surface of the PCB, and
the elastic member contacts the second face.

17. The cable device of claim 16, wherein at least a portion of the elastic member protrudes outward from the mounting surface of the PCB to contact the second face.

18. The cable device of claim 14, wherein the elastic member comprises:
an elastic part that is elastically deformable by an external force,
an outer part covering an outer surface of the elastic part and having a conductivity, and
an adhesive part provided as at least a portion of the outer part and contacting the ground electrode with adhesive strength.

19. A cable device comprising:
a cable including
a conductor, and
a transparent coating covering the conductor; and
a connector coupled to the cable, wherein the connector comprises:
a printed circuit board (PCB) including a ground electrode,
a shield case, having a conductivity, in which the PCB is accommodated, and
an elastic member, accommodated in the shield case, electrically connecting the ground electrode to the shield case and being compressively deformed between the PCB and the shield case.

20. The cable device of claim 19, wherein
the shield case includes a first face facing a mounting surface of the PCB, and
the elastic member contacts the ground electrode and the first face.

* * * * *